US011126597B2

(12) United States Patent
Ormerod et al.

(10) Patent No.: US 11,126,597 B2
(45) Date of Patent: Sep. 21, 2021

(54) EFFICIENT DATABASE TABLE ROTATION AND UPGRADE

(71) Applicant: ServiceNow, Inc., Santa Clara, CA (US)

(72) Inventors: Ellen Lorraine Ormerod, Chicago, IL (US); Josef Mart, Chicago, IL (US)

(73) Assignee: ServiceNow, Inc., Santa Clara, CA (US)

( * ) Notice: Subject to any disclaimer, the term of this patent is extended or adjusted under 35 U.S.C. 154(b) by 315 days.

(21) Appl. No.: 16/250,728

(22) Filed: Jan. 17, 2019

(65) Prior Publication Data

US 2020/0233841 A1    Jul. 23, 2020

(51) Int. Cl.
*G06F 16/21* (2019.01)
*G06F 16/242* (2019.01)
*G06F 16/23* (2019.01)

(52) U.S. Cl.
CPC ........ *G06F 16/211* (2019.01); *G06F 16/2365* (2019.01); *G06F 16/242* (2019.01)

(58) Field of Classification Search
CPC ... G06F 16/2365; G06F 16/242; G06F 16/211
USPC ........................................................ 707/803
See application file for complete search history.

(56) References Cited

U.S. PATENT DOCUMENTS

| 5,978,594 | A  | 11/1999 | Bonnell |
| 6,321,229 | B1 | 11/2001 | Goldman |
| 6,799,189 | B2 | 9/2004  | Huxoll |
| 6,816,898 | B1 | 11/2004 | Scarpelli |
| 6,895,586 | B1 | 5/2005  | Brasher |
| 6,916,898 | B2 | 7/2005  | Kuroki et al. |
| 7,020,706 | B2 | 3/2006  | Cates |
| 7,027,411 | B1 | 4/2006  | Pulsipher |
| 7,392,300 | B2 | 6/2008  | Anantharangachar |
| 7,617,073 | B2 | 11/2009 | Trinon |
| 7,685,167 | B2 | 3/2010  | Mueller |
| 7,716,353 | B2 | 5/2010  | Golovinsky |
| 7,769,718 | B2 | 8/2010  | Murley |

(Continued)

OTHER PUBLICATIONS

"Database Rotation", Feb. 14, 2014, Old Wiki, <old.wiki/index.php/Database_Rotation> (Year: 2014).*

(Continued)

*Primary Examiner* — Hosain T Alam
*Assistant Examiner* — Robert F May
(74) *Attorney, Agent, or Firm* — Fletcher Yoder PC

(57) ABSTRACT

A database server may include a master table schema that defines a database table's configuration and an arrangement for corresponding shadow tables. The shadow tables contain data related to contiguous and non-overlapping time periods and writing to the shadow tables occurs in a rotational fashion so that only one active table is written to at any point. The server may upgrade the master table schema. The server then may determine that a rotation event has occurred where a first shadow table is active and a second shadow table is associated with an oldest of the contiguous and non-overlapping time periods. In response, the server may delete data in the second table, determine that the schema has been upgraded since the second table was most recently active, upgrade the second table's schema to match the schema, and set the second table to active enabling writing to the second table.

20 Claims, 12 Drawing Sheets

(56) References Cited

U.S. PATENT DOCUMENTS

| | | |
|---|---|---|
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Mikousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,137,115 B2 | 9/2015 | Mayfield |
| 9,326,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,473 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,044,566 B1 | 8/2018 | Grisco et al. |
| 10,073,903 B1* | 9/2018 | Arye .................... G06F 16/951 |
| 2002/0174142 A1 | 11/2002 | Demers et al. |
| 2007/0266004 A1* | 11/2007 | Wall .................... G06F 16/2477 |
| 2008/0183778 A1* | 7/2008 | Neogi .................... G06F 16/22 |
| 2012/0041988 A1 | 2/2012 | Driesen |
| 2013/0103657 A1* | 4/2013 | Ikawa ................. G06F 16/2477 |
| | | 707/693 |
| 2013/0179476 A1* | 7/2013 | Saam .................... G06F 16/278 |
| | | 707/803 |
| 2014/0372489 A1* | 12/2014 | Jaiswal ............... G06F 16/2365 |
| | | 707/812 |
| 2014/0372702 A1* | 12/2014 | Subramanyam .... G06F 12/0848 |
| | | 711/129 |
| 2015/0347555 A1* | 12/2015 | Vyas .................... G06F 16/113 |
| | | 707/662 |
| 2016/0179850 A1* | 6/2016 | Martin ................. G06F 16/214 |
| | | 707/634 |
| 2017/0371910 A1* | 12/2017 | Joo ...................... G06F 16/2329 |
| 2019/0163545 A1* | 5/2019 | Singh ................... G06F 16/278 |

OTHER PUBLICATIONS

"Table Rotation", Sep. 12, 2017, Old Wiki, <old.wiki/index.php/Table_Rotation> (Year: 2017).*

Woodruff, Tim. "Improving Performance on Older Instances with Table Rotation." https://snprotips.com/blog/2018/6/19/improving-performance-on-older-instances-with-table-rotation. Jun. 19, 2018.

International Search Report and Written Opinion for PCT Application No. PCT/US2020/013945 dated Apr. 9, 2020; 13 pgs.

* cited by examiner

EFFICIENT DATABASE TABLE ROTATION AND UPGRADE

BACKGROUND

A database is an organized collection of data, generally stored and accessed electronically via computing systems. Such a database may use a database management system to interact with end users and applications and to capture and analyze data. Within the database, database tables are typically used to further organize data. Particularly, a table is a collection of related data held in a structured format according to the table's schema. Each table can consist of a number of columns and rows that help organize data for subsequent preservation and access. As such, an enterprise may use database tables to store data generated by nodes associated with the enterprise.

SUMMARY

Database tables can grow quickly in size when an enterprise generates and stores a large amount of data in the tables. For example, a table configured to store the log data that is generated by computing devices and other nodes associated with the enterprise may increase substantially in size when the log data has a high volume. The size of a table can impact the performance and use of the table, including the time required to efficiently write data to the table and the time required to query data organized by the table.

In order to prevent tables from growing too large in size, table rotation may be used. Table rotation is a technique used to divide a single table into multiple portions (i.e., smaller tables) configured to store and contain data. These portions are often each related to contiguous and non-overlapping time periods. Writing to these smaller tables occurs in a rotational fashion such that only one table is active and written to at any point in time. Due to the rotational aspect of writing to one active table at a time, table rotation may be used to simplify the deletion of old data. In particular, the data stored in an oldest non-active table can be deleted before the oldest non-active table becomes the active table. As a result, table rotation may enable each table to be cleared periodically prior to becoming active.

Although table rotation can help prevent tables from becoming too large, there still exists a need to be able to modify the arrangement data stored and represented in the tables. For instance, columns may be added or removed from time to time. But doing so for tables that are related to one another by a rotation mechanism can be challenging. Naïve solutions modify the schema of all such tables at the same time, which can be an expensive and time consuming operation especially for tables with a large number of rows. Furthermore, the tables may be locked (made unavailable for writing) during such modifications, which can result in incoming data that would normally be stored therein being lost or queued for a long period of time.

The embodiments herein address and solve these problems by modifying the schema of a particular table only when that table is about to be rotated to become the active table. All entries from the particular table are deleted (e.g., the table is truncated), the modification is applied to the particular table when it is thus emptied, and then the particular table becomes the active table. This process is repeated over time when further inactive tables are rotated to become the active table. Doing so eliminates the computationally expensive operation of modifying the schema of a table with a large amount of data, and also maintains the ability to continuously write data to the active table even when other tables are being modified.

Accordingly, a first example embodiment may involve a database server device comprising one or more processors, a master table schema that defines a configuration of a database table, and a plurality of shadow tables arranged according to the master table schema. The shadow tables contain respective data related to respective contiguous and non-overlapping time periods. Writing to the shadow tables occurs in a rotational fashion so that only one active table of the shadow tables is written to at any point in time. The database server device further includes program instructions that, when executed by the one or more processors, cause the database server device to perform operations. The operations include updating the master table schema. The operations also include determining that a rotation event for the shadow tables has occurred, where a first table of the shadow tables is the active table, and a second table of the shadow tables is associated with an oldest of the contiguous and non-overlapping time periods. The operations further include, in response to determining that the rotation event for the shadow tables has occurred, (i) deleting the respective data in the second table, (ii) determining that the master table schema has been updated since the second table was most recently the active table, (iii) updating a schema of the second table to match the master table schema, and (iv) setting the second table to be the active table. The operations also include writing further data to the second table.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
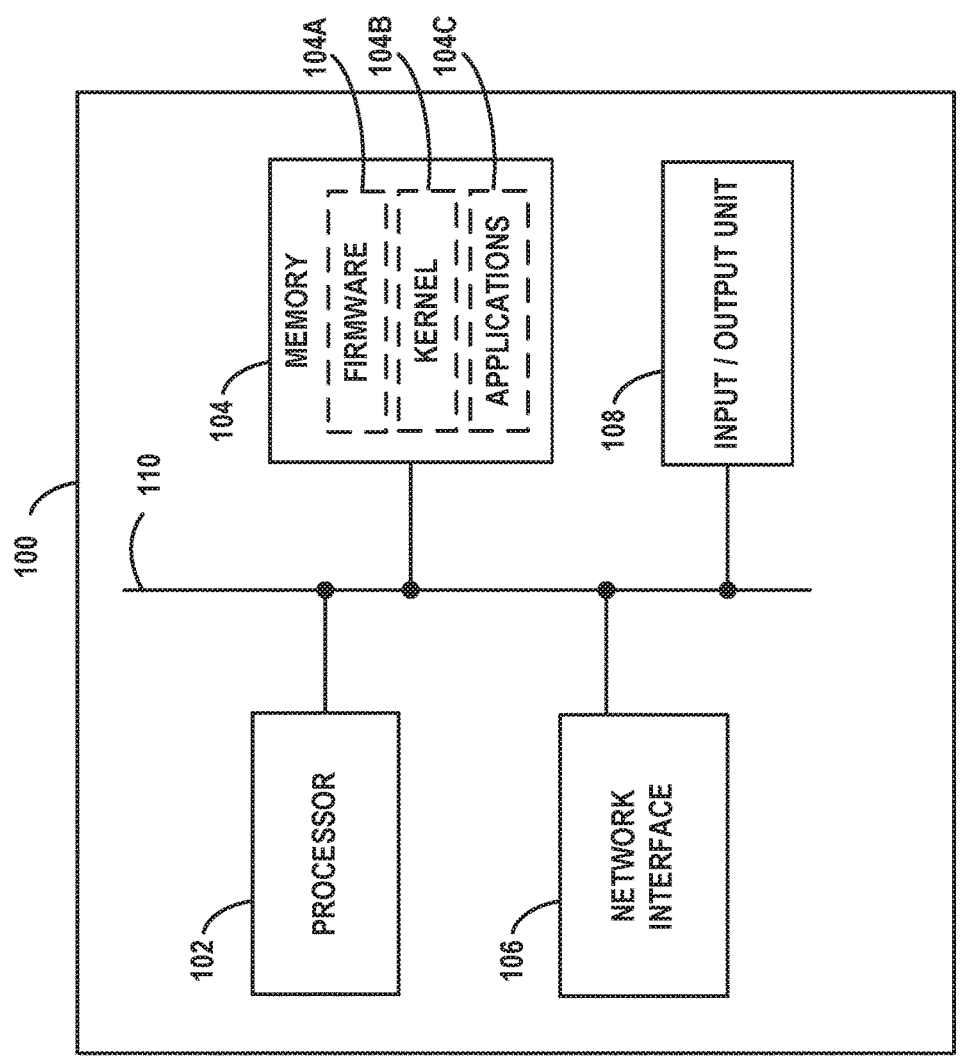
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), a database server device, or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
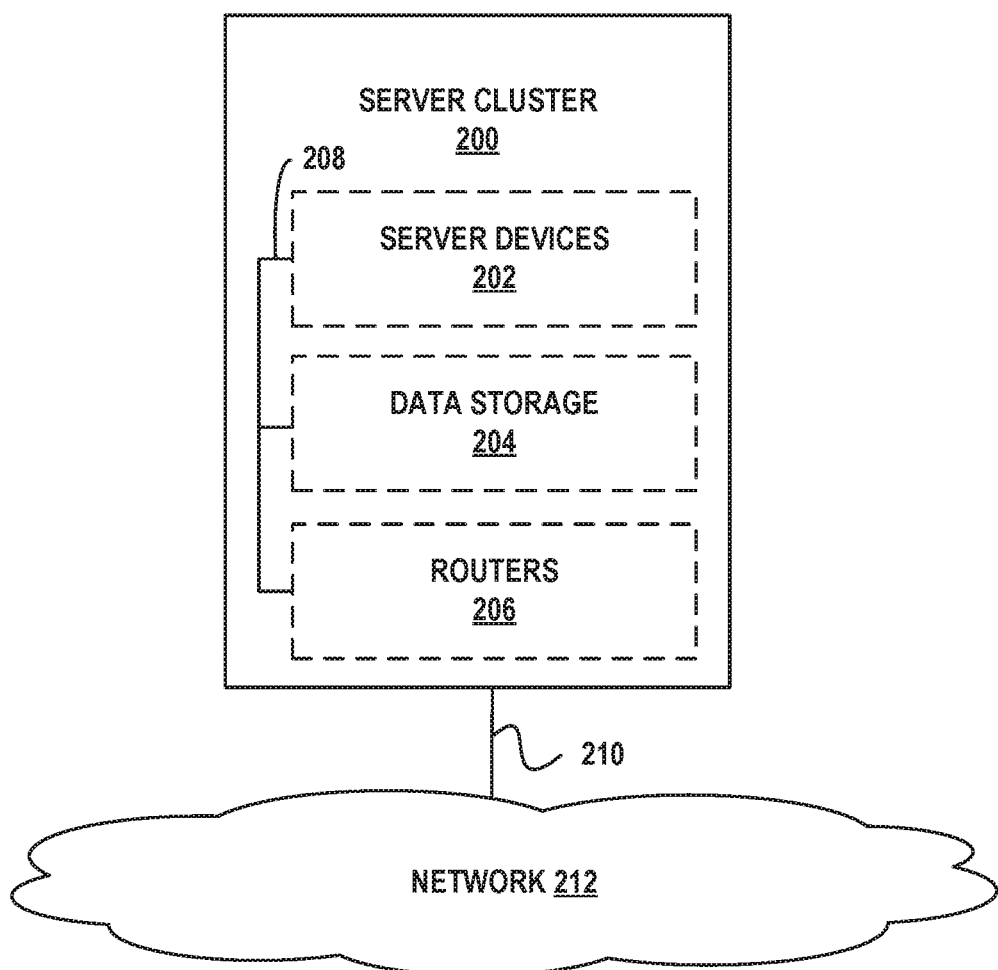
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
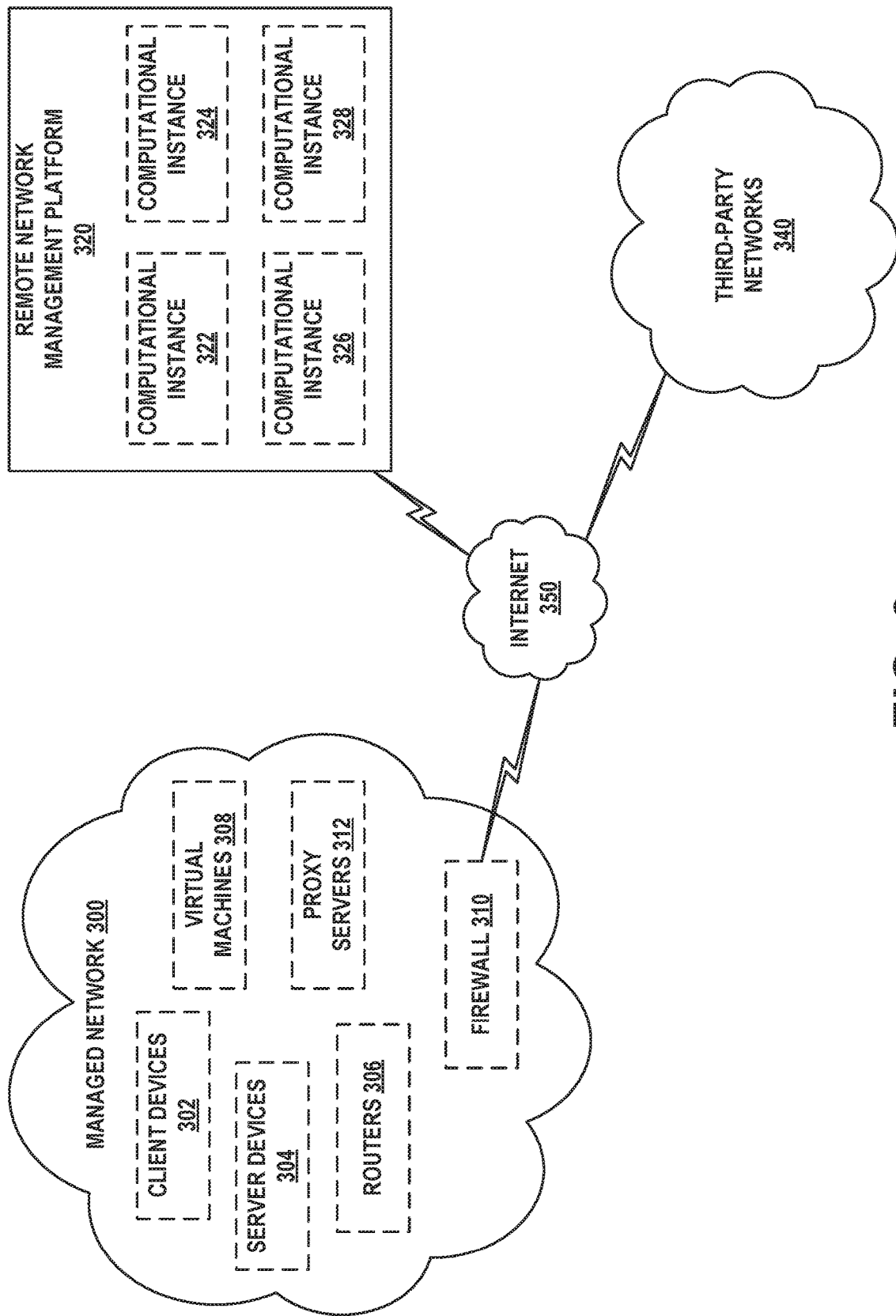
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
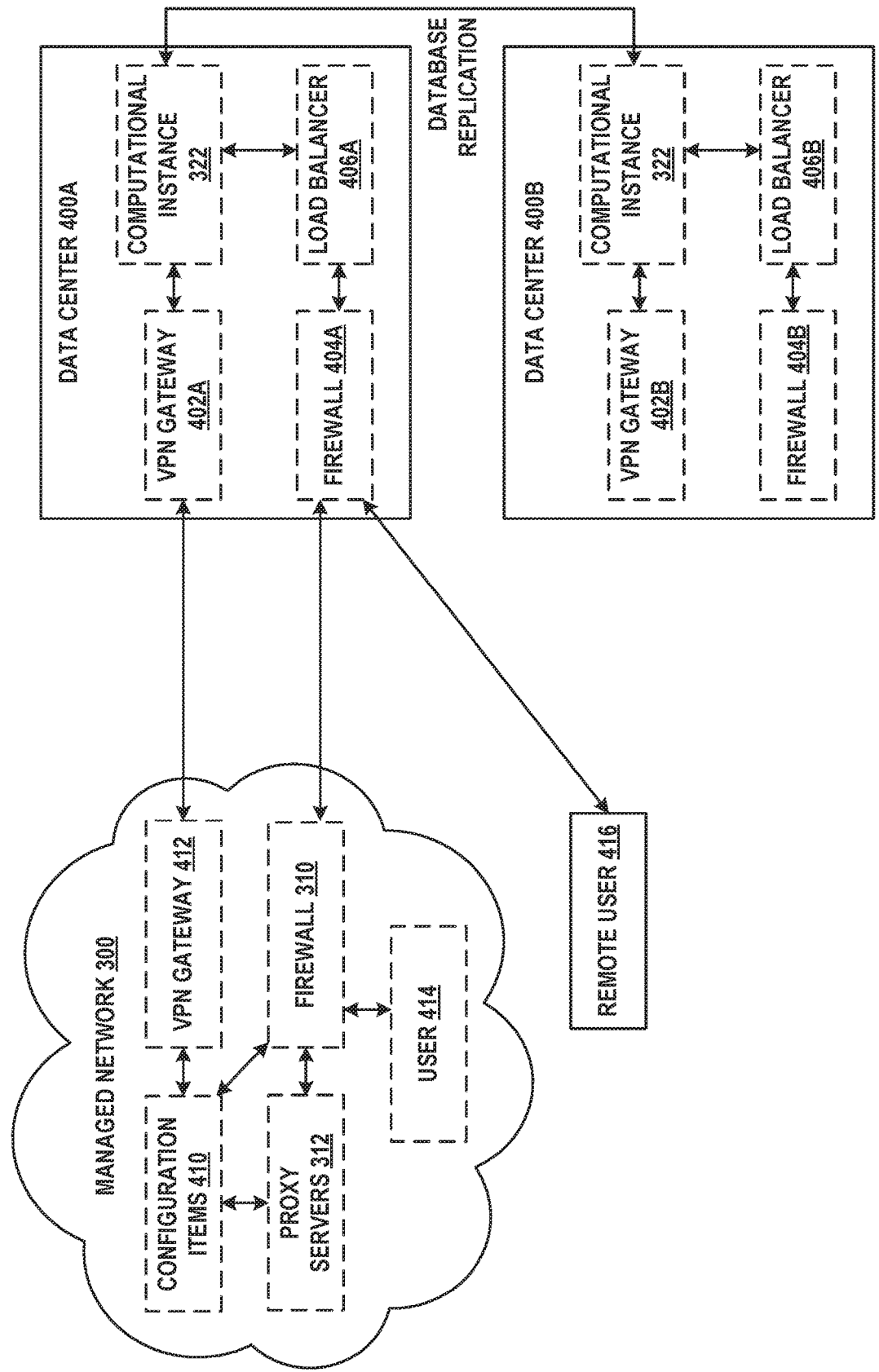
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
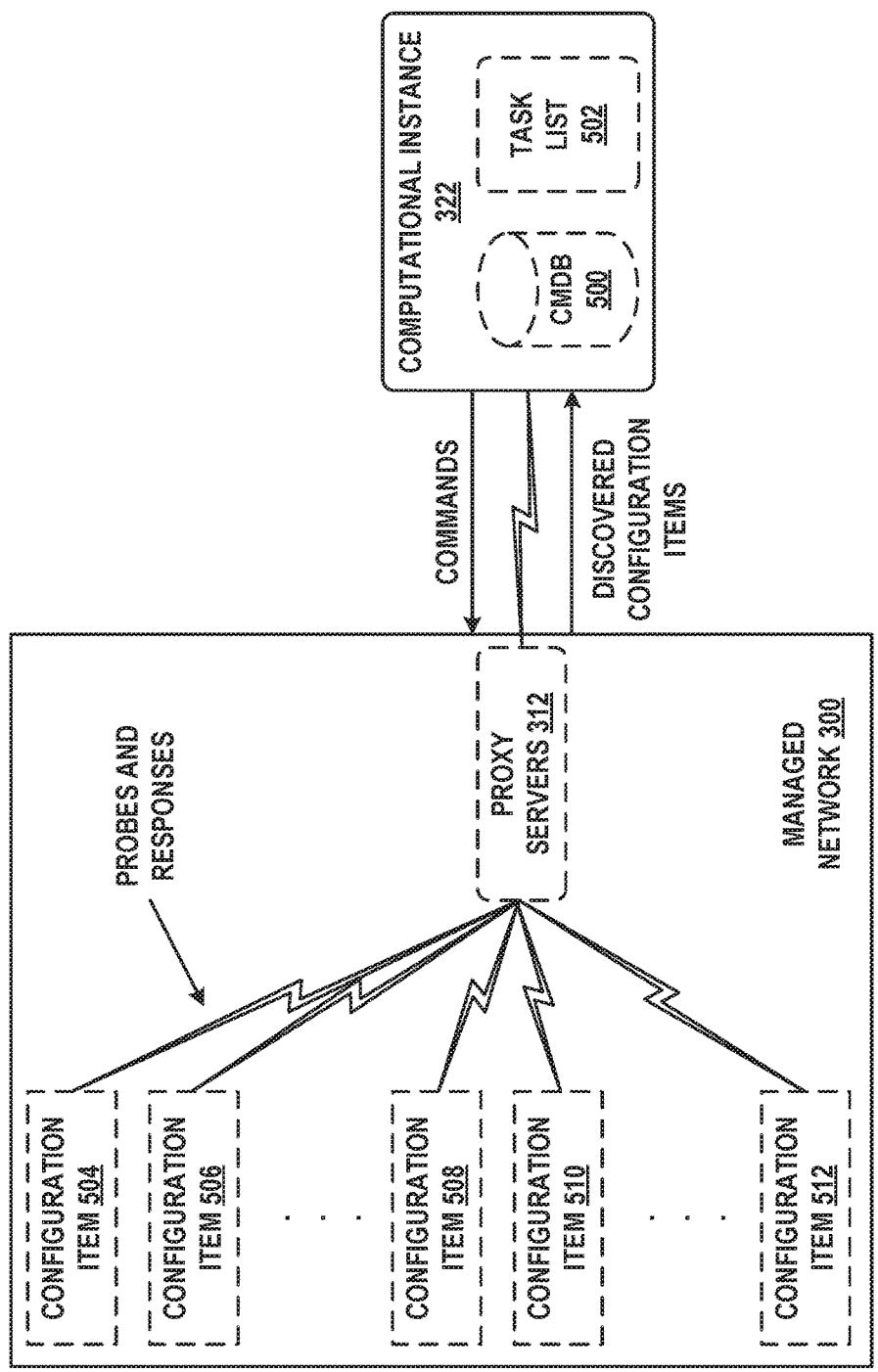
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
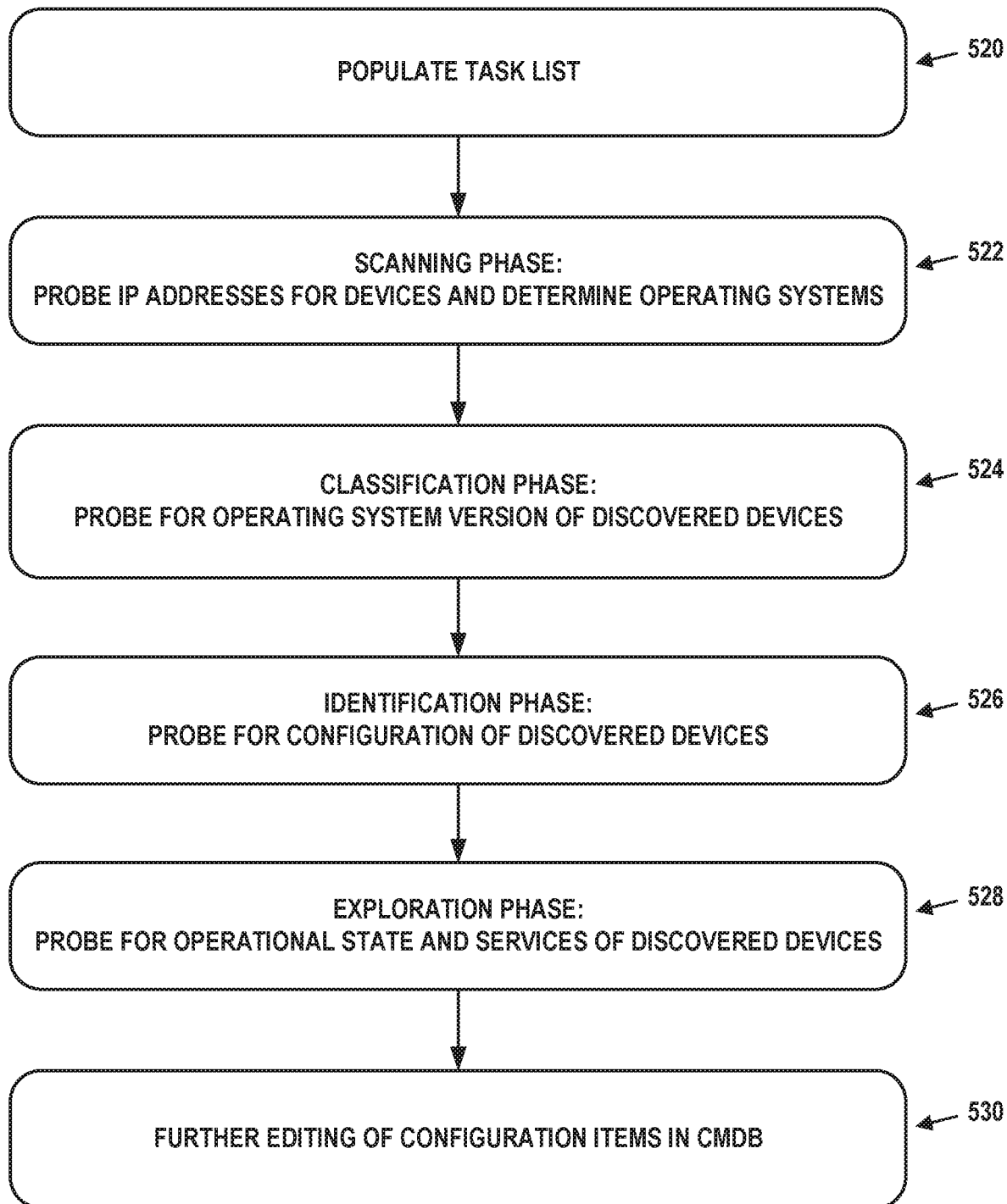
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EFFICIENT DATABASE TABLE ROTATION AND UPGRADE

An enterprise may store information within a database, such as data accumulated during an enterprise's operations. For instance, data generated by nodes associated with the enterprise, such as computing devices, servers, applications, and other systems, may be stored within an SQL database or another type of database (e.g., data storage 204 shown in FIG. 2). Regardless of type, a database may include one or more tables, each configured to store, organize, and provide access to the data generated during operations. The relationships between the tables within a database depend on the database's schema. The database's schema may also specify formulas (i.e., integrity constraints) used when storing and organizing data.

Each table within the database is configured to organize a collection of related data as specified by the schema. The schema may specify the configuration of the table, including structural rules for organizing data assigned to the table and management rules for the data (e.g., access rights to the data). For example, the table's schema may specify a quantity of columns for the table and what types of data should be organized within each column (e.g., integers, text strings, etc.). As a table receives data from a system (e.g., a data server device), the table may add rows to accommodate each newly received set of data.

In some embodiments, remote network management platform 320 may facilitate and maintain a database for an enterprise, such as the enterprise associated with managed network 300. For instance, computational instance 322 may include one or more databases, each configured with data tables available to support, store, and organize data obtained from nodes associated with managed network 300, such client devices 302, server devices 304, routers 306, virtual machines 308, and proxy servers 312. As a result, devices and applications within managed network 300 may have access to the data stored in the one or more databases in computational instance 322.

A system may store various types of information using tables, such as data that an enterprise wishes to preserve and have access to for a particular duration (e.g., days, weeks, months, or years). Example data that may be stored for longer durations may include accounting, financial, employee, and transactional information.

The system may also use tables to store data that is only temporarily useful, such as log data that records events that occur at nodes or communications that occur between nodes. A system may use stored log data for troubleshooting and debugging transactions and events that take place among nodes. Since a large enterprise may include numerous nodes generating log data at any given time, the tables used to store and organize the log data might grow rapidly in size. A large table can impact processing requirements for operations related to managing or using the table, such as reconfiguring, searching, deleting, modifying, and archiving data. Thus, a table that increases rapidly in size can negatively affect the performance of the database.

To manage large volumes of data, a system may use table rotation to prevent tables from growing too large in size. Table rotation involves partitioning data among multiple small tables rather than utilizing a single large table. When implementing table rotation, a system may use a master table schema that defines a configuration of a database table to arrange a set of small tables for use in a rotational fashion. The small tables, referred to herein as shadow tables, may be used in place of a single large table. In particular, the shadow tables may be arranged to receive and contain data related to respective contiguous and non-overlapping time periods. Thus, writing to the shadow tables occurs in a rotational fashion such that only one table of the shadow tables is active and written to at any point in time, while all others are inactive. As a result, ten tables with 100 rows of data each may store the same amount of data as a single table with 1000 rows of data.

The system may add data as new rows to the active shadow table. A rotation event may occur and signal that a new shadow table is about to rotate into the active position. The rotation event may vary within examples. For instance, a rotation event may be a particular change in time (e.g., the transition between hours, days, or weeks) or an event related to data storage at the currently active shadow table (e.g., the amount of data stored to the currently active table surpassing a threshold). When a shadow table rotates to be active, the system may then write to that shadow table until a subsequent rotation event. As such, a shadow table that is about to become active may be associated with an oldest of the contiguous and non-overlapping time periods.

In some embodiments, the shadow tables rotate in a manner similar to a first-in-first-out (FIFO) circular buffer. For example, the shadow tables may be arranged according to equation 1.

$$\text{Active} = (\text{Active} + 1) \bmod N \qquad (1)$$

In this equation, N represents the number of shadow tables, the shadow tables are index with the integers 0 . . . N−1, respectively, and Active contains the index of the current active table.

During table rotation, the system may be configured to modify the contents of the shadow tables. For instance, the system may detect a rotation event and responsively delete the rows of the shadow table that is about to be active. This way, the shadow table may rotate into the active position in an empty state. Thus, table rotation may enable periodic deletion of the data of each shadow table. By periodically deleting data within each shadow table, the system may prevent the overall amount of data stored in the shadow tables from growing too large in size. In other examples, the system may modify the contents of a shadow table in other ways, such as archiving a portion of the data using another table or database.

To further illustrate, an example scenario may involve using table rotation to store weekly log data obtained from nodes associated with an enterprise. In the example scenario, a system may utilize a set of seven shadow tables arranged according to a master table schema. Each shadow table may be configured to store and organize data for a particular day of the week (i.e., a first shadow table represents Sunday, a second shadow table represents Monday, and so on). Since the system may write to the shadow tables in a rotational fashion, only one shadow table may be active and written to during each day. Rotation may occur at a set time each day, such as midnight or another time of day.

In the example scenario, the system may also be configured to periodically delete data from the prior day during table rotation. For example, the system may delete the contents of a shadow table containing the oldest data when the day of the week changes (e.g., rotation may occur at midnight each day). This way, a shadow table that is about to become active may be cleared prior to being used to store data from the new day. As a result, the set of shadow tables may perform more effectively compared to a much larger data table while being able to store the same amount of data generated during each week. For instance, the shadow tables may require less processing time resources when being searched than one large, monolithic table.

Although table rotation can assist with the storage and management of a large volume of data, situations might arise where a modification to the overall schema is desired. For instance, a client device may provide a schema change request to the system. A platform upgrade may also require modifying the schema. Since data is preserved and organized using multiple shadow tables in a rotational fashion, upgrading schema of the shadow tables is not the same as upgrading the schema a single database table. Notably, the schema of the single database table must be changed when that table contains data, which can take minutes or hours depending on the amount of data in the table. On the other hand, all data can be deleted from the oldest shadow database table before its schema is modified. As a result, the schema modification process is significant faster, essentially a constant time operation.

Further, it might be desirable to be able to write incoming data while the upgrade is taking place. This cannot occur when a single database is upgraded, because that table will be locked. The embodiments herein, however, only upgrade inactive shadow tables. Therefore, this upgrade has no impact on the ability of the active shadow table to store the incoming data.

Example embodiments presented herein involve efficient table rotation and upgrade. A system may use the techniques described herein to efficiently upgrade a master table schema and corresponding shadow tables within a table rotation without interrupting access to stored data. An example embodiment may involve a system checking for an upgrade to the schema prior to rotating a non-active shadow table to the active position. Upon detecting an upgrade to the schema that has not been applied to the non-active shadow table since the non-active shadow table was most recently active, the system may upgrade the non-active shadow table and then set the non-active shadow table to active. In some embodiments, the system may be configured to delete data stored in the non-active shadow table prior to upgrading the non-active shadow table. Due to table rotation, the system may write to upgraded shadow tables when active without interrupting access to data stored in other shadow tables. The system may be configured to repeat the above process to upgrade all shadow tables.

FIGS. 6A-6E illustrate an example scenario for upgrading shadow tables in response to a master table schema upgrade. One or more computing devices may perform the different steps depicted in FIGS. 6A-6E. For example, a database server device may be configured to perform the table upgrade process.

Herein, an upgrade includes any modification to a database table, including addition of one or more new columns, deletion of one or more existing columns, changing the data type(s) of one or more columns, and so on. Other types of upgrades are possible.

Figure 6A:
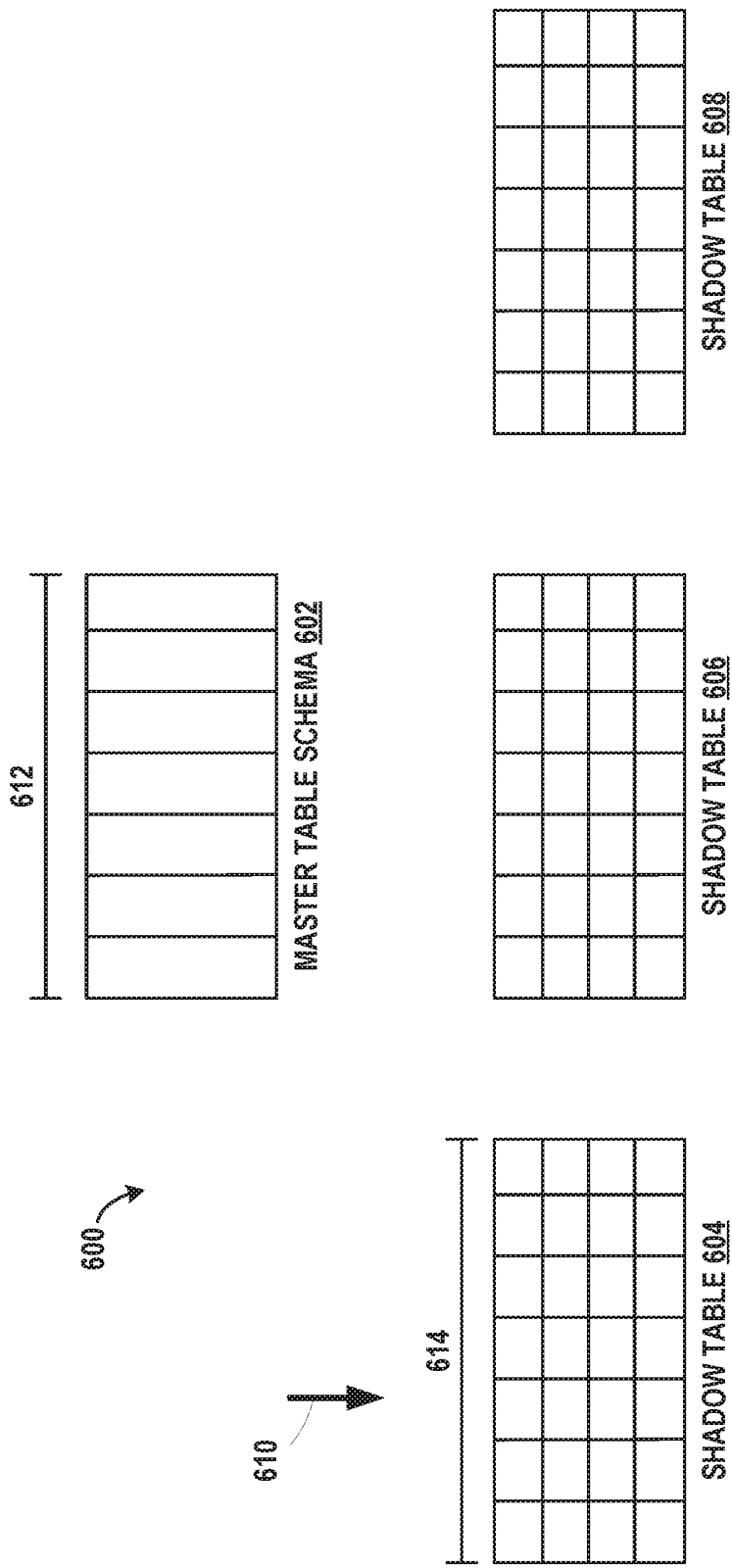
FIG. 6A illustrates a master table schema and corresponding shadow tables, in accordance with example embodiments.

FIG. 6A illustrates an example master table schema and corresponding shadow tables. As shown, scenario 600 depicts master table schema 602, corresponding shadow tables 604, 606, 608, and active pointer 610. Active pointer 610 indicates that shadow table 604 is active, while shadow tables 606 and 608 are inactive. In other examples, scenario 600 may have other configurations, such as a configuration with more or fewer shadow tables. The quantity of shadow tables may depend on the frequency of rotation during a period of time or other factors, such as the quantity of data being stored.

As shown in FIG. 6A, master table schema 602 may specify that the configuration of the database table includes columns 612. These columns may define rules for storing data values of a particular type (e.g., integer, text string). The database table may be accessible by nodes associated with an enterprise. For instance, client devices, applications, and other computing devices may be configured to access data organized according to master table 602.

Scenario 600 further shows shadow tables 604, 606, 608 that are arranged according to master table schema 602. In particular, a system may use shadow tables 604, 606, 608 to store and organize data written to shadow tables 604-608 in a rotational fashion rather than using a single table. Thus, shadow tables 604-608 may contain data related to contiguous and non-overlapping time periods since writing to shadow tables 604-608 occurs in a rotational fashion (e.g., the system writes to only one shadow table at any point in time).

As noted above, active pointer 610 is further included in scenario 600 to illustrate the shadow table that is currently active in the table rotation. In FIG. 6A, active pointer 610 is pointing to shadow table 604, indicating that shadow table 604 is currently active. Thus, the system may write to shadow table 604 in the current state.

Figure 6B:
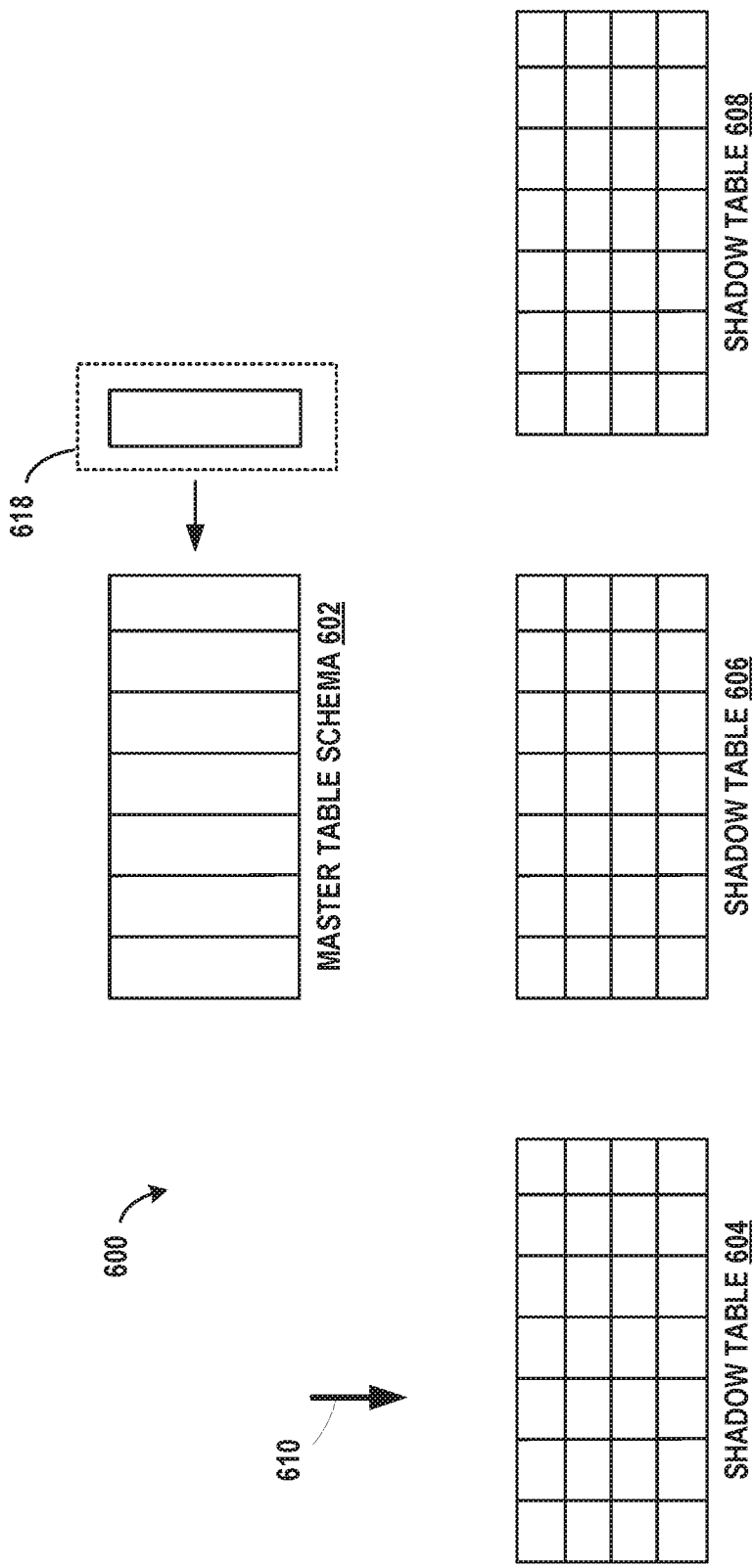
FIG. 6B illustrates an upgrade to the master table schema, in accordance with example embodiments.

FIG. 6B illustrates an example upgrade to master table schema 602. Within examples, the upgrade to the master table schema may be applied by one or more computing devices, such as a database server device. For instance, the database server device may execute program instructions to upgrade master table schema 602. The origination of the upgrade and type of upgrade may vary. For instance, a client device or another node associated with an enterprise may request the upgrade to master table schema 602.

As shown in FIG. 6B, the upgrade to master table schema 602 may involve the addition of column 618. In particular, configuring master table schema 602 to include column 618 may enable the database table to be used to store a new category of information. In other examples, the upgrade may involve other modifications to master table schema 602, such as adding multiple columns or removing one or more columns. The upgrade may also involve adjusting other aspects of the configuration of the database table, such as altering other rules for the shadow tables.

A rotation event may be a trigger that causes movement of the active pointer from one shadow table to another. This movement may be in accordance with Equation 1, for example. For instance, rotation events may correspond to particular points in time (e.g., every day at midnight, every Sunday at 3 am, etc.). In response to detecting the rotation event, the system may be configured to make shadow table 606 the active table.

Prior to making to shadow table 606 active, the system may be configured to compare the schema for shadow table 606 to master table schema 602. In particular, the system may perform the comparison to determine if the schema for shadow table 606 needs to be upgraded to match an upgrade applied to master table schema 602. If the system determines that the schema for shadow table 606 matches master table schema 602, the system may set shadow table 606 to active and write to shadow table 606 without modifying the schema for shadow table 606. At this point, shadow table 604 is inactive, but still maintains storage of its data.

In some instances, the system may determine that the schema for shadow table 606 does not match master table schema 602. As a result, the system may be configured to upgrade the schema for shadow table 606 to match master table schema 602 prior to setting shadow table 606 as the active table.

Figure 6C:
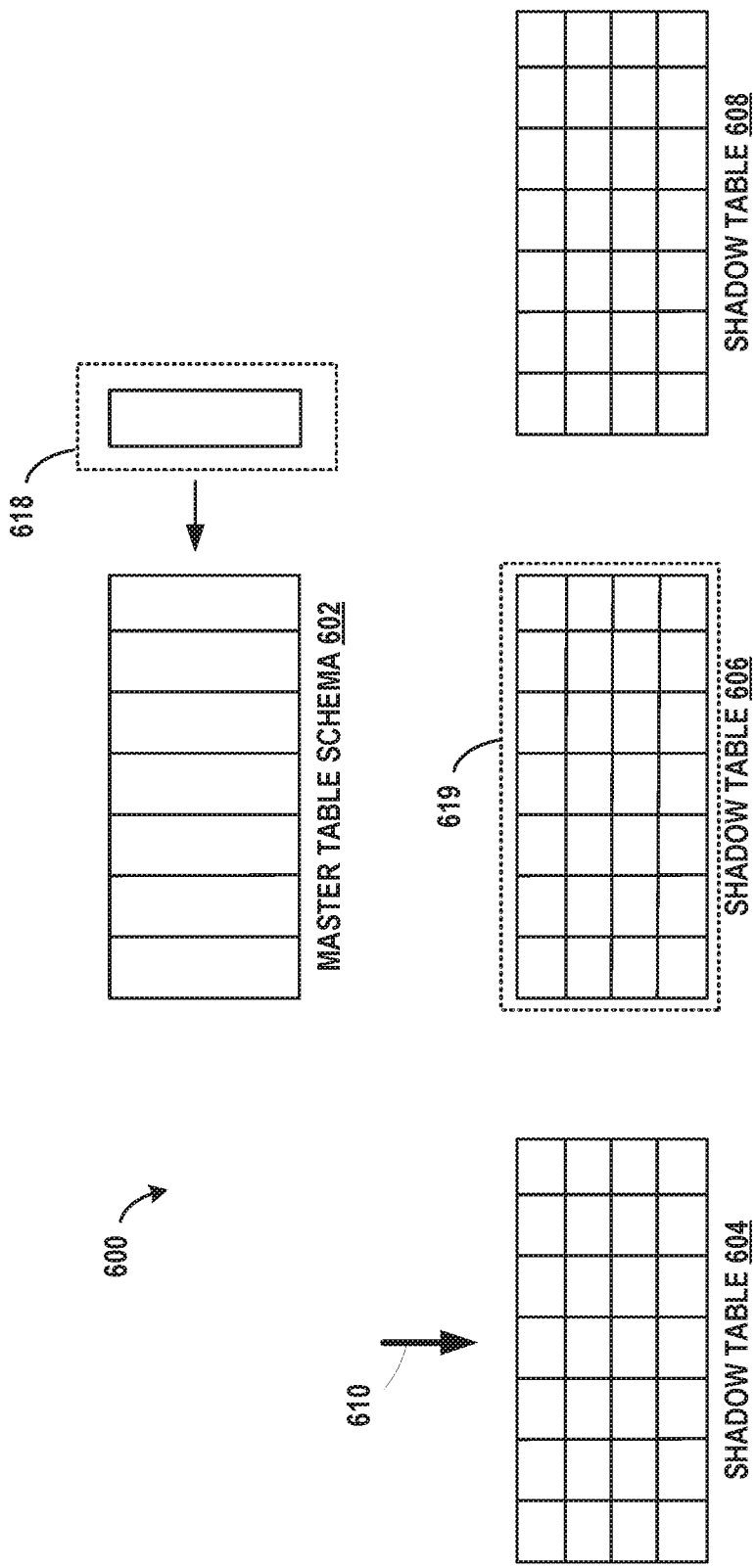
FIG. 6C illustrates deletion of the entries in a shadow table, in accordance with example embodiments.

In particular, the system may be configured to delete the data (rows) of shadow table 606 prior to upgrading its schema. FIG. 6C illustrates a modification to data in a shadow table. In particular, the modification corresponds to a deletion of the data in shadow table 606 as represented by dotted box 619. The system may be configured to delete the data in shadow table 606 in response to determining that the rotation for the shadow tables has occurred. In other examples, the system may modify the data in shadow table in other ways (e.g., only a portion of the data is deleted).

Figure 6D:
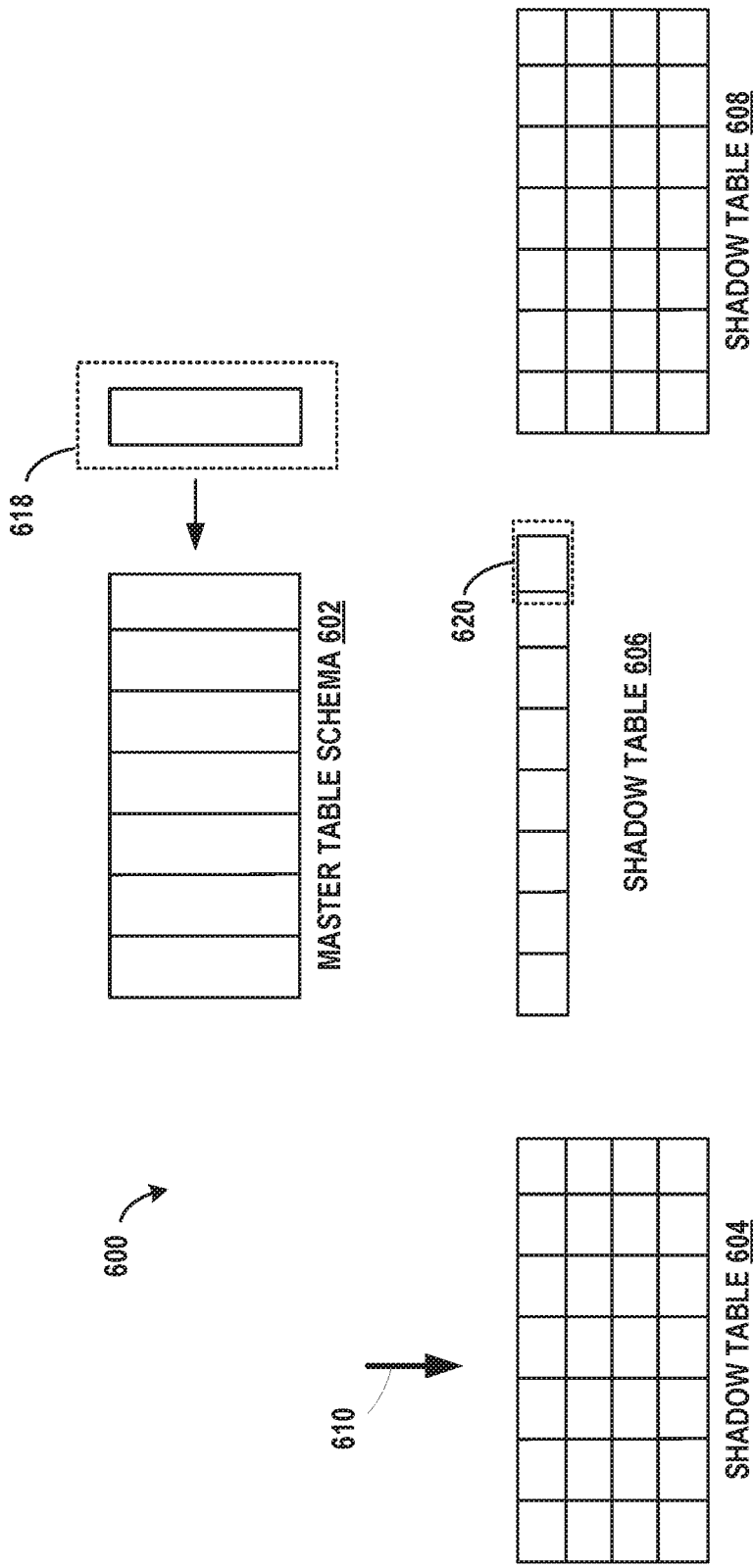
FIG. 6D illustrates an upgrade of a schema of a shadow table to match the master table schema, in accordance with example embodiments.

FIG. 6D illustrates an upgrade of a schema of a shadow table to match the master table schema. In FIG. 6D, shadow table 606 is show as being truncated to represent that its data has been deleted. As shown, upgrading the schema of shadow table 606 may involve causing the schema to include column 620 similar to the addition of column 618 to master table schema 602. Since this operation takes place on an empty table, the operation can complete very rapidly in comparison to adding a column to a table with rows of data.

Figure 6E:
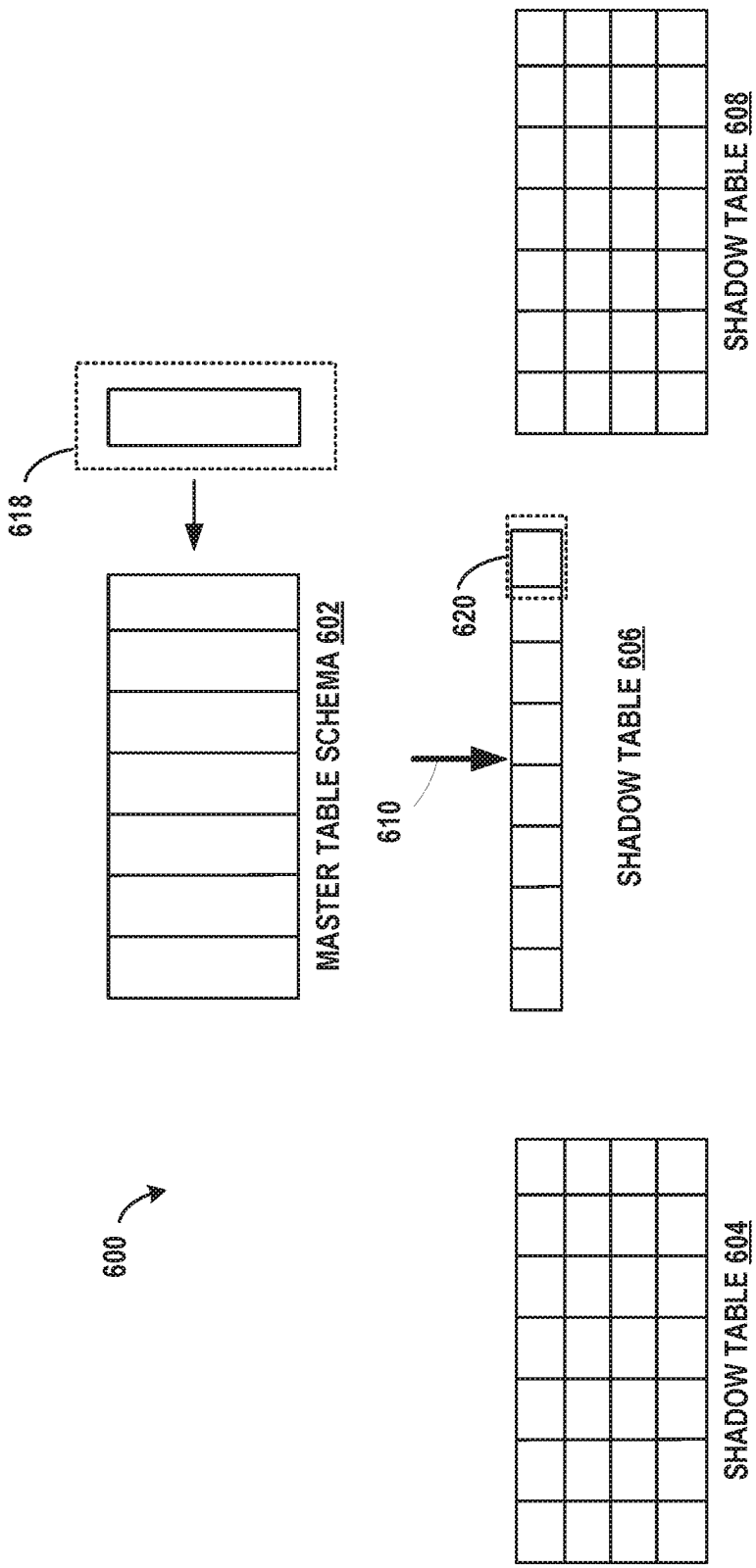
FIG. 6E illustrates the upgraded shadow table being set to the active table to enable writing data to the upgraded shadow table, in accordance with example embodiments.

FIG. 6E illustrates the upgraded shadow table being set to the active table to enable writing data to the upgraded shadow table. Particularly, the system may set shadow table 606 as the active table to enable writing to shadow table 606.

Notably, the system may set shadow table 606 to active after modifying the schema for shadow table 606 to match master table schema 602. After doing so, shadow table 608 contains the oldest data (and is therefore in line to be the active shadow table after the next rotation event) and shadow table 604 contains the second oldest data. The system may write data to shadow table 606 until a subsequent rotation event for the shadow tables has occurred. Upon detection of the subsequent rotation event, the system may repeat the process illustrated in FIGS. 6A-6E to determine whether or not to upgrade the schema of the next shadow table that is to be set as active (i.e., shadow table 608).

The system may be configured to repeat the process multiple times until determining that the next shadow table to become active has a schema that already matches master table schema 602. This way, the system may check and confirm that each shadow table's schema matches master table schema 602. The upgrade is complete once all shadow table schemas match master table schema 602. In some examples, the system may provide a signal to an administrator that the upgrade is complete.

In some embodiments, a computing device may repeat the process described in FIGS. 6A-6E continuously. The computing device may perform a routine check to determine whether the schema of a shadow table that is rotating into an active position matches master table schema 602. In other embodiments, the computing device may perform the process in response to a signal that master table schema 602 was upgraded. For instance, the computing device or another computing device may upgrade master table schema 602 and proceed to perform the upgrade process to shadow tables 604-608 as a result.

Various embodiments may enable more efficient searches of data stored at shadow tables 604-608. In some instances, the system may utilize differences in the schemas for shadow tables to reduce time and processing requirements required to perform a search. To illustrate an example, the system may receive a query for particular data. After receiving the query, the system may determine that the particular data corresponds to data that would be stored according to added column 618 of upgraded master table schema 602. As a result, the system may only search shadow tables that have an upgraded schema that matches upgraded master table schema 602. Thus, if only shadow table 606 has been upgraded to match master table schema 602 as shown in FIG. 6E, the system may perform a search of shadow table 606 to efficiently identify the particular data associated with the request. On the other hand, if a query is for data in a column that appears in all shadow tables regardless of their upgrade statuses, the system may search all of these shadow tables. In other embodiments, the system may permit searching shadow tables that have upgraded schemas only after all shadow tables have been upgraded. In further embodiments, the system may permit searching a shadow table for information contained according to an upgraded schema only when a data range is given that corresponds only to that shadow table within the query.

In some embodiments, the system may efficiently search shadow tables 604-608 for data when the query indicates a particular time range. This assumes that at least one of the columns in the shadow table schemas include a timestamp per row. For instance, the system may receive a query for data within a specific a time period. Using the time period, the system may identify that only particular shadow tables that are storing within the time period specified (e.g., shadow table 606 and shadow table 608). As a result, the system may efficiently search for the data by only searching shadow table 606 and shadow table 608 (e.g., reducing the number of shadow tables searched).

VI. EXAMPLE OPERATIONS

Figure 7:
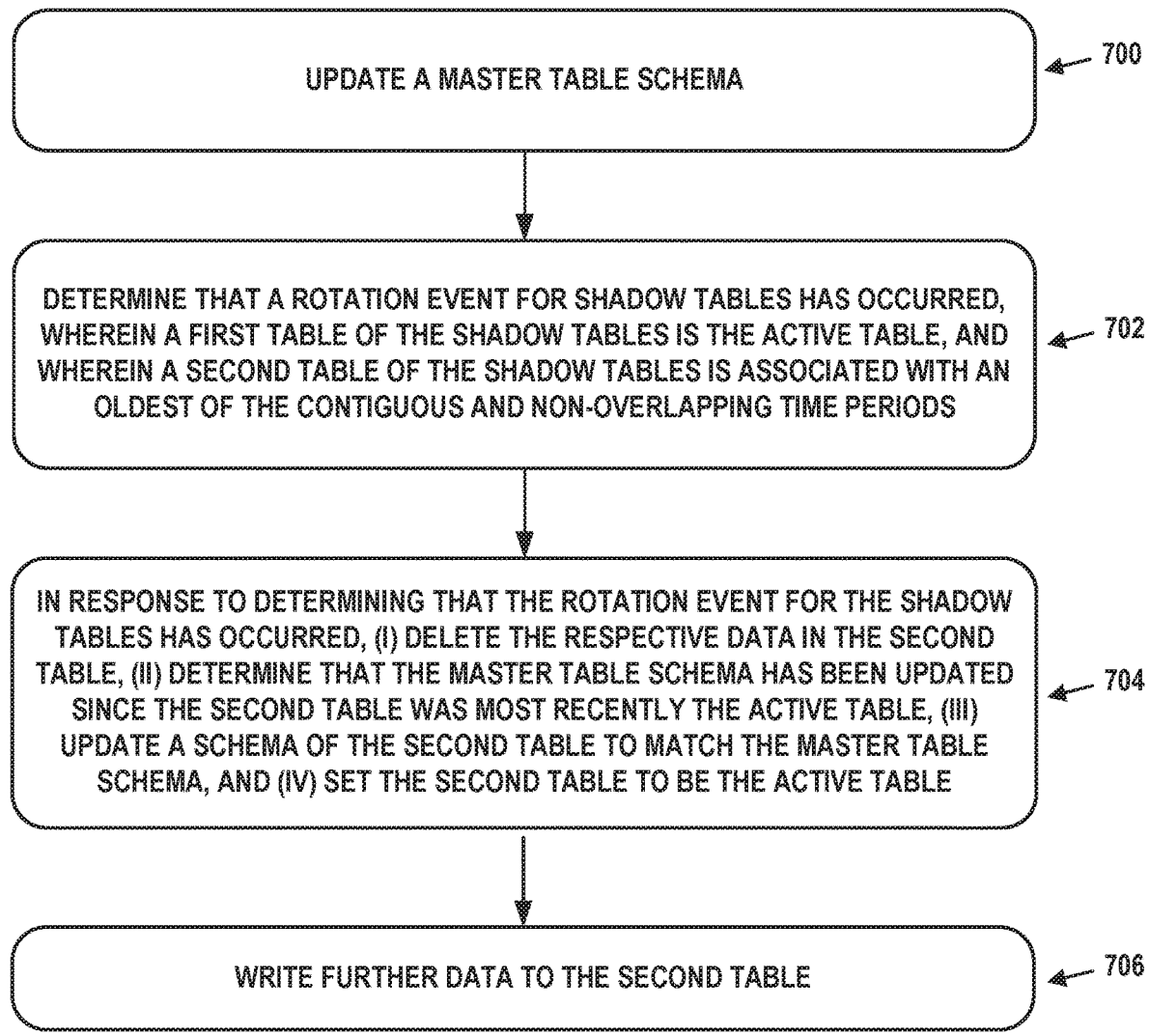
FIG. 7 is a flow chart, in accordance with example embodiments.

FIG. 7 is a flow chart illustrating an example embodiment. The process illustrated by FIG. 7 may be carried out by a computing device, such as computing device 100, a database server device, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 involves updating the master table schema. The master table schema may define a configuration of a database table. A plurality of shadow tables may be arranged according to the master table schema such that the shadow tables contain data related to contiguous and non-overlapping time periods (e.g., each shadow table contains data related to a different 24 hour period). The shadow tables are written to in a rotational fashion so that only one active table of the shadow tables is written to at any point in time.

Updating the master table schema may cause modifications to the configuration of the database. For instance, the upgrade may involve adding one or more additional columns for storing and organizing additional data. In other examples, the upgrade may involve removing one or more columns as specified by the master table schema.

In some embodiments, updating the master table schema involves receiving a request from a client device to update and updating the master table schema in response to the request.

Block 702 involves determining that a rotation event for the shadow tables has occurred. For instance, a first table of the shadow tables may be the active table, and a second table of the shadow tables is associated with an oldest of the contiguous and non-overlapping time periods. The rotation event may correspond to a particular time change.

Block 704 involves, in response to determining that the rotation event for the shadow tables has occurred, (i) deleting the respective data in the second table, (ii) determining that the master table schema has been upgraded since the second table was most recently the active table, (iii) updating a schema of the second table to match the master table schema, and (iv) setting the second table to be the active table.

Block 706 involves writing further data to the second table. Once the second table is active, the system may enable writing further data to the second table. Data may be written to the second table until the system determines that a subsequent rotation event for the shadow tables has occurred.

Some embodiments may further involve determining that a second rotation event for the shadow tables has occurred. The second rotation event may occur at a second time that is subsequent to the initial rotation described above. In particular, the second table of the shadow tables may be the active table and a third table of the shadow tables may be associated at the second with an oldest of the contiguous and non-overlapping time periods. In response to determining that the second rotation event for the shadow tables has occurred, a computing device may (i) delete the respective data in the third table, (ii) determine that the master table schema has been updated since the third table was most recently the active table, (iii) update a schema of the third table to match the master table schema, and (iv) set the third table to be the active table. The computing device may be configured to write further data to the third table.

In some examples, a computing device may further determine that a third rotation event for the shadow tables has occurred. The third rotation event may occur at a third time. In particular, the third table of the shadow tables may be the active table and the first table of the shadow tables is associated at the third time with an oldest of the contiguous and non-overlapping time periods. In response to determining that the third rotation event for the shadow tables has occurred, a computing device may (i) delete the respective data in the first table, and (ii) determine whether a schema of the first table matches the master table schema. In response to determining that the schema of the first table matches the master table schema, the computing device may set the first table to be the active table and write further data to the first table. In addition, some embodiments may involve a system that includes the means to perform the different steps described in blocks 700, 702, 704, 706.

In some embodiments, a computing device (e.g., server) may receive a query for data stored in the shadow tables. The query for data may specify a time range that the data was generated. In response to receiving the query for data, the computing device may identify a subset of the shadow tables that store respective data generated during the time range specified in the query. The computing device may then perform a search for the data only in the subset of the shadow tables. In other embodiments, the computing device may receive a query for particular data stored in the shadow tables. The particular data may correspond to a given type of data stored in a column added during the upgrade to the master table schema. Based on receiving the query, the computing device may identify a subset of the shadow tables that have been upgraded to include respective columns for storing the given type of data. The computing device may then perform a search for the particular data only in the subset of the shadow tables.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A database server device comprising:
one or more processors;
a master table schema that defines a configuration of a database table;
a plurality of shadow tables arranged according to the master table schema, wherein the shadow tables contain respective data related to respective contiguous and non-overlapping time periods, and wherein writing to the shadow tables occurs in a rotational fashion so that only one active table of the shadow tables is written to at any point in time; and
program instructions that, when executed by the one or more processors, cause the database server device to:
upgrade the master table schema;
determine that a rotation event for the shadow tables has occurred, wherein a first table of the shadow tables is the active table, and wherein a second table of the shadow tables is associated with an oldest of the contiguous and non-overlapping time periods;
in response to determining that the rotation event for the shadow tables has occurred, (i) delete the respective data in the second table, (ii) determine that the master table schema has been upgraded since the second table was most recently the active table, (iii) upgrade a schema of the second table to match the upgraded master table schema, and (iv) set the second table to be the active table; and
write further data to the second table.

2. The database server device of claim 1, wherein the database server device is configured to upgrade the master table schema in response to a request received from a client device.

3. The database server device of claim 1, wherein the program instructions further cause the database server device to:
determine that a second rotation event for the shadow tables has occurred, wherein the rotation event occurs at a first time and the second rotation event occurs at a second time, wherein the second table of the shadow tables is the active table at the second time, and wherein a third table of the shadow tables is associated at the second time with an oldest of the contiguous and non-overlapping time periods;
in response to determining that the second rotation event for the shadow tables has occurred, (i) delete the respective data in the third table, (ii) determine that the master table schema has been upgraded since the third table was most recently the active table, (iii) upgrade a schema of the third table to match the upgraded master table schema, and (iv) set the third table to be the active table; and
write additional data to the third table.

4. The database server device of claim 3, wherein the program instructions further cause the database server device to:
determine that a third rotation event for the shadow tables has occurred, wherein the third rotation event occurs at a third time, wherein the third table of the shadow tables is the active table at the third time, and wherein the first table of the shadow tables is associated at the third time with an oldest of the contiguous and non-overlapping time periods;
in response to determining that the third rotation event for the shadow tables has occurred, (i) delete the respective data in the first table, and (ii) determine whether a schema of the first table matches the upgraded master table schema;
in response to determining that the schema of the first table matches the upgraded master table schema, set the first table to be the active table without modifying the schema of the first table; and
write data to the first table.

5. The database server device of claim 1, wherein upgrading the master table schema involves adding a column to the master table schema.

6. The database server device of claim 1, wherein upgrading the master table schema involves removing a column from the master table schema.

7. The database server device of claim 1, wherein writing further data to the second table comprises:
writing further data to the second table until determining that a subsequent rotation event for the shadow tables has occurred.

8. The database server device of claim 1, wherein the shadow tables containing respective data related to respective contiguous and non-overlapping time periods comprises the shadow tables containing respective data related to contiguous twenty-four hour periods.

9. The database server device of claim 1, wherein determining that the rotation event for the shadow tables has occurred comprises:
determining that a particular point in time has occurred, wherein the particular point in time has been configured as a trigger for the rotation event.

10. The database server device of claim 1, wherein the database server device is further configured to:
receive a query for data stored in the shadow tables, wherein the query for data specifies a time range that the data was generated;
responsive to receiving the query for data, identify a subset of the shadow tables that store respective data generated during the time range specified in the query; and
perform a search for the data only in the subset of the shadow tables.

11. The database server device of claim 1, wherein the database server device is further configured to:
receive a query for particular data stored in the shadow tables, wherein the particular data corresponds to a given type of data stored in a column added during the upgrade to the master table schema;
based on receiving the query, identify a subset of the shadow tables that have been upgraded to include respective columns for storing the given type of data; and
perform a search for the particular data only in the subset of the shadow tables.

12. A method comprising:
updating, by a database server device, a master table schema, wherein the master table schema defines a configuration of a database table, wherein a plurality of shadow tables are arranged according to the master table schema, wherein the shadow tables contain respective data related to respective contiguous and non-overlapping time periods, and wherein writing to the shadow tables occurs in a rotational fashion so that only one active table of the shadow tables is written to at any point in time;
determining, by the database server device, that a rotation event for the shadow tables has occurred, wherein a first table of the shadow tables is the active table, and wherein a second table of the shadow tables is associated with an oldest of the contiguous and non-overlapping time periods;

in response to determining that the rotation event for the shadow tables has occurred, the database server device: (i) deleting the respective data in the second table, (ii) determining that the master table schema has been updated since the second table was most recently the active table, (iii) updating a schema of the second table to match the updated master table schema, and (iv) setting the second table to be the active table; and writing, by the database server device, further data to the second table.

13. The method of claim 12, wherein updating the master table schema comprises:

receiving a request from a client device to update the master table schema; and in response to receiving the request, updating the master table schema.

14. The method of claim 12, comprising:

determining that a second rotation event for the shadow tables has occurred, wherein the rotation event occurs at a first time and the second rotation event occurs at a second time, wherein the second table of the shadow tables is the active table at the second time, and wherein a third table of the shadow tables is associated at the second time with an oldest of the contiguous and non-overlapping time periods;

in response to determining that the second rotation event for the shadow tables has occurred, (i) deleting the respective data in the third table, (ii) determining that the master table schema has been updated since the third table was most recently the active table, (iii) updating a schema of the third table to match the updated master table schema, and (iv) setting the third table to be the active table; and writing data to the third table.

15. The method of claim 14, comprising:

determining that a third rotation event for the shadow tables has occurred, wherein the third rotation event occurs at a third time, wherein the third table of the shadow tables is the active table at the third time, and wherein the first table of the shadow tables is associated at the third time with an oldest of the contiguous and non-overlapping time periods;

in response to determining that the third rotation event for the shadow tables has occurred, (i) deleting the respective data in the first table, and (ii) determining whether a schema of the first table matches the updated master table schema;

in response to determining that the schema of the first table matches the updated master table schema, setting the first table to be the active table; and writing data to the first table.

16. The method of claim 12, wherein updating the master table schema comprises:

updating the master table schema to add a column to the master table schema.

17. The method of claim 12, wherein updating the master table schema comprises:

updating the master table schema to remove a column from the master table schema.

18. The method of claim 12, comprising:

receiving a query for data stored in the shadow tables, wherein the query for data specifies a time range that the data was generated;

responsive to receiving the query for data, identifying a subset of the shadow tables that store respective data generated during the time range specified in the query; and performing a search for the data only in the subset of the shadow tables.

19. The method of claim 12, comprising:

receiving a query for particular data stored in the shadow tables, wherein the particular data corresponds to a given type of data stored in a column added during the update to the master table schema;

based on receiving the query, identifying a subset of the shadow tables that have been updated to include respective columns for storing the given type of data; and performing a search for the particular data only in the subset of the shadow tables.

20. An article of manufacture comprising a non-transitory computer-readable medium, having stored thereon program instructions that, upon execution by a computing system, cause the computing system to perform operations comprising:

updating a master table schema, wherein the updated master table schema defines a configuration of a database table, wherein a plurality of shadow tables are arranged according to the updated master table schema, wherein the shadow tables contain respective data related to respective contiguous and non-overlapping time periods, and wherein writing to the shadow tables occurs in a rotational fashion so that only one active table of the shadow tables is written to at any point in time;

determining that a rotation event for the shadow tables has occurred, wherein a first table of the shadow tables is the active table, and wherein a second table of the shadow tables is associated with an oldest of the contiguous and non-overlapping time periods;

in response to determining that the rotation event for the shadow tables has occurred, (i) deleting the respective data in the second table, (ii) determining that the master table schema has been updated since the second table was most recently the active table, (iii) updating a schema of the second table to match the updated master table schema, and (iv) setting the second table to be the active table; and writing data to the second table.

* * * * *